Oct. 17, 1944. W. P. POWERS 2,360,581
OPTICAL INDICATOR
Filed Feb. 24, 1943
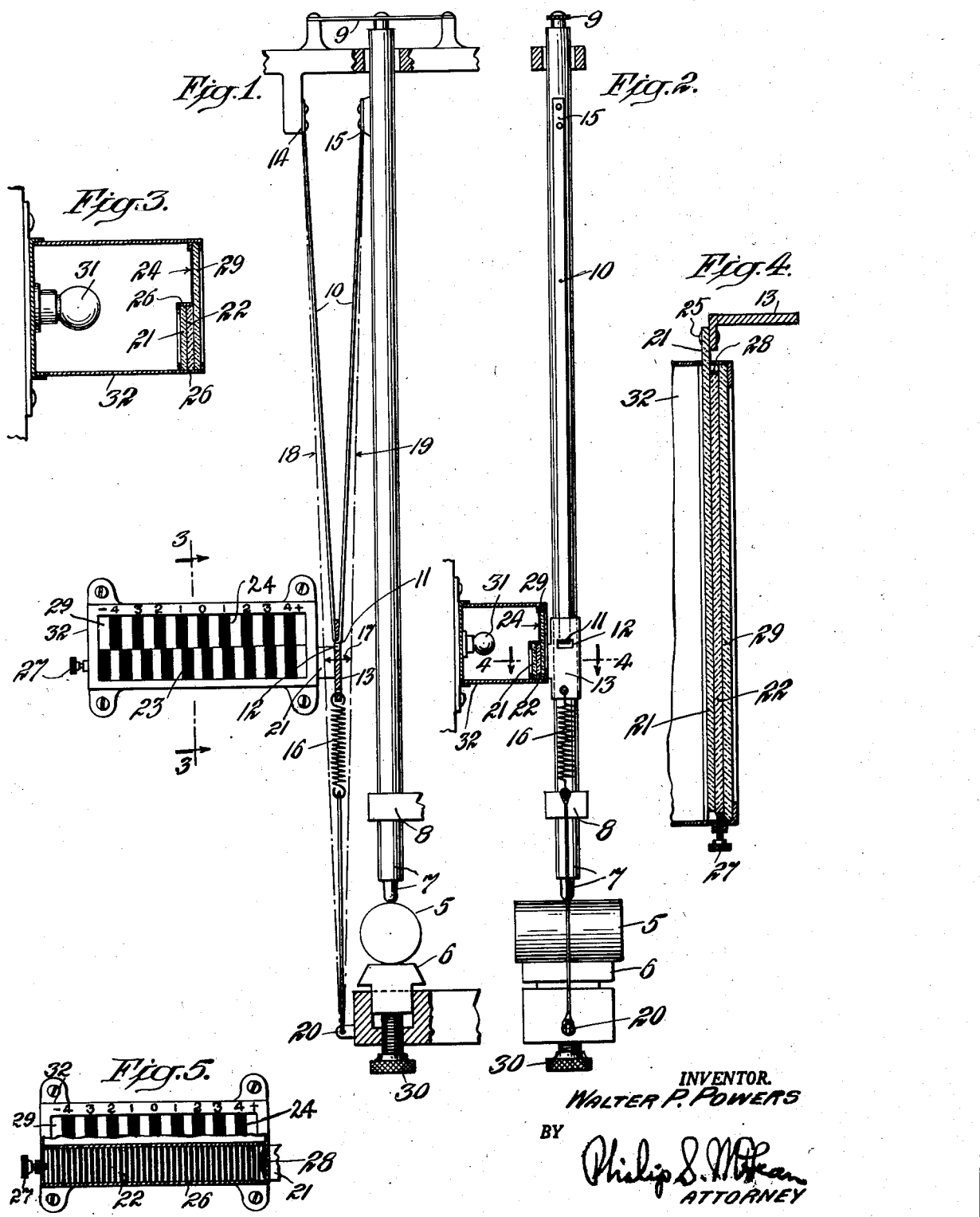
INVENTOR.
WALTER P. POWERS
BY
Philip S. Millan
ATTORNEY Patented Oct. 17, 1944

2,360,581

UNITED STATES PATENT OFFICE 2,360,581

OPTICAL INDICATOR

Walter P. Powers, Newark, N. J., assignor to Associated Patentees, Inc., Ampere, N. J., a corporation of New Jersey Application February 24, 1943, Serial No. 476,987

3 Claims. (Cl. 88—14)

The invention herein disclosed relates to optical indicators and instruments of that general character.

In earlier Powers Patents 2,246,001 and 2,246,002 of June 17, 1941, instruments are disclosed in the nature of limit gages aand calipers providing visual indication by relative movement of screens or grids lined or arranged in vernier relation to create phantom or shadow pointers exaggerating or magnifying the smaller variations detected by such instruments.

In the present invention, the same principle of small variations or changes creating magnified readings or indications is employed, particularly with a view to providing a quick acting and easily read instrument for accurately gaging, sizing, and comparing pieces which should meet certain standards in size, weight or other values.

Other objects of the invention are to provide means for actuating such a gage, which will be particularly sensitive to the lesser variations, yet rugged enough to stand the treatment to which it may be subjected and in general, to provide means as above, which will be entirely practical and satisfactory for its intended purposes.

The novel features of the invention by which the foregoing and other desirable objects are attained are set forth in the following specification, illustrated by way of example in the accompanying drawing and covered in the claims.

In the drawing, there is shown one practical embodiment of the invention, but the structure may be modified and changed as regards this particular illustration, all within the true intent and scope of the invention as hereinafter defined and claimed.

Fig. 1 is a broken front elevation of an instrument in the nature of a comparator embodying features of the invention.

Fig. 2 is a broken side view partly in vertical section.

Fig. 3 is an enlarged vertical sectional detail as on line 3—3 of Fig. 1.

Fig. 4 is a further enlarged horizontal sectional detail as on line 4—4 of Fig. 2.

Fig. 5 is a front elevation of the indicator box, partly in section.

In the form of apparatus illustrated, the work or piece 5, to be measured, compared or the like, is inserted between the rest 6, and the end of a plunger or "feeler" 7.

The movable measuring or "sensing" element is shown as operable longitudinally in a guide 8, and as yieldingly supported and tensioned in a desired intermediate position by a spring supporting strip 9, riveted or otherwise connected with the end of rod 7.

A constant, substantially frictionless connection is provided from the sensing plunger to the movable element of the gage, in the form of a wire, strip, tape or ribbon 10, doubled upon itself to form a bight 11, extending through an opening 12, in a tensioning plate 13, and having one of its ends anchored to a fixed support at 14 and its opposite end attached to the plunger at 15.

This strip is held firmly tensioned as indicated by a spring 16, connected with plate 13.

It will be evident that lifting or lowering movements of plunger 7, will tend to shorten or lengthen that portion of the strip connected with the plunger and that such action will result in spring 16, pulling the apex 11, of this triangular connection to the right or to the left, within the limits represented at 17, between straight lines 18, 19, extended from the points 14, 15, of anchorage of the strip to the anchorage point 20 of the spring. It will be further evident that longitudinal shifting movements of the sensing rod will effect definitely proportional greater, lateral shifting movements of the point or apex of the tensioned double sided strip connection.

These amplified movements may be applied to the operation of a simple swinging pointer or like form of indicator, but preferably the action is further amplified by the special vernier form of indicator illustrated and comprising a movable lined grid 21, actuated from the shifting tape and cooperative with a relatively fixed lined grid 22, to optically create the movable scale 23, in cooperative relation to the relatively fixed vernier scale 24.

The movable grid may be a light piece of sheet plastic, directly attached to and carried by the tension plate, as indicated at 25.

The relatively fixed grid may be a similar piece of plastic but slidingly mounted at 26, and adjustable longitudinally by a thumb screw 27, against the tension of a spring 28.

The vernier scale 24, may be on or be carried by the more or less transparent protective covering or window 29, over these grids.

The pitch of the movable optical scale 23, is determined by the width and spacing of the lines on the grids and by the vernier relation of these two grids to each other, provided usually by a slight difference in the number of equally spaced lines in equal areas of the two grids or by slightly separating two grids of equally spaced lines to create an angular viewing relation.

The direction of movement of the indicating scale may be controlled by recognition of the fact that movement of the grid of finer pitch creates movement of the indicating scale in the same direction and movement of the coarser lined grid creates apparent movement, that is, travel of the optically formed grid in the opposite direction.

In the illustration, it can be assumed that the finer pitch grid is shifted by the tensioned tape to the left, to correspondingly indicate undersize conditions of the workpiece and to the right to indicate oversize conditions. The fixed vernier scale is shown arranged accordingly. This scale may be calibrated to thousandths of an inch for convenience of indicating variations directly in units of measurement or it may be calibrated in any arbitrary fashion, for example, merely to show arbitrary oversize or undersize values.

For the purpose of initially setting the instrument, the work support may be adjustable as by means of a thumb screw 30. By adjusting this screw against a Johansson block or other standard inserted beneath the plunger, the machine may be set to bring the movable scale into zero position on the fixed scale, so that any variations from this standard will show up as so many degrees to one side or the other of the zero position.

Similarly, or as a part of the initial adjustment, the thumb screw 27, may be turned to adjust the relatively fixed grid to bring the optical or shadow scale into zero registration with the fixed vernier scale.

A lamp 31, may be arranged in back of the grids or screens, within the enclosure 32, to sharply illuminate the gage markings. The upper vernier scale may be produced optically, after the manner of the movable scale, or in any other way, such as by projecting it onto a ground glass screen.

The V-shaped actuator, instead of being composed of a single, doubled strip, may be made up of two shorter strips secured together at their convergent ends, for example, by being both secured to the tensioning plate. In such event, both strips should be of the same metal or of metals having the same coefficient of expansion, so that temperature changes will not substantially affect the accuracy of the instrument.

While in the case illustrated the action is effected by shifting one side of the V-shaped actuator, it is contemplated that both ends may be shifted in reverse directions, thus to further amplify the extent of lateral movement. Also it is contemplated that instead of being directly carried by the convergent strips, the movable indicator grid may be mounted in a lateral guideway and be shifted in one or both directions by a push or pull engagement or connection between the convergent strips and movable indicator element.

The flexible V-arranged strip or strips forming the impulsing or actuating member, while usually of metal, might be of some other material and might be maintained taut and firm by other tensioning means, such as a weight, instead of a spring. If both ends are shifted from the work sensing element, they may be supported by being attached at opposite sides of the pivot center of a walking beam type of lever and such lever may then be extended to serve as or form part of the work sensing means.

While the invention is illustrated in use in an instrument for measuring size, in the nature of a comparator, it is realized that it may be applied to measurement of weight and other values. Details of structure may be widely varied. The parts may all be mounted within a cabinet or enclosure suitably supporting the various elements in the relation substantially as illustrated.

What is claimed is:

1. In an instrument of the character disclosed, the combination of superposed grids mounted for straight line movement one over the other and made up each of equally spaced straight parallel lines disposed substantially at right angles to the direction of movement and with the lines of one grid differently spaced from the lines of the other grid to create an enlarged optical vernier scale of heavier lines also substantially at right angles to the direction of movement and shiftable by relative movement of said differently lined grids, and a fixed vernier scale of different pitch from said movable optical vernier scale and lined substantially at right angles to the direction of movement of and in vernier relation to said movable optical vernier scale.

2. In an instrument of the character disclosed, the combination of superposed grids mounted for straight line movement one over the other and made up each of equally spaced straight parallel lines disposed substantially at right angles to the direction of movement and with the lines of one grid differently spaced from the lines of the other grid to create an enlarged optical vernier scale of heavier lines also substantially at right angles to the direction of movement and shiftable by relative movement of said differently lined grids, a fixed vernier scale of different pitch from said movable optical vernier scale and lined substantially at right angles to the direction of movement of and in vernier relation to said movable optical vernier scale, one of said grids being normally fixed but initially adjustable for lining up said vernier scales and means for effecting an initial setting of said initially adjustable grid.

3. In an instrument of the character disclosed, the combination of superposed grids mounted for straight line movement one over the other and made up each of equally spaced straight parallel lines disposed substantially at right angles to the direction of movement and with the lines of one grid differently spaced from the lines of the other grid to create an enlarged optical vernier scale of heavier lines also substantially at right angles to the direction of movement and shiftable by relative movement of said differently lined grids, and a second vernier scale of different pitch from said movable optical vernier scale at one side of and lined substantially at right angles to the direction of movement of and in vernier relation to said movable optical vernier scale.

WALTER P. POWERS.